United States Patent [19]

Sterwerf, Jr.

[11] Patent Number: 4,766,995
[45] Date of Patent: Aug. 30, 1988

[54] PUSHER-TYPE CONVEYOR CHAIN

[75] Inventor: Lester J. Sterwerf, Jr., Harrison, Ohio

[73] Assignee: The Cincinnati Mine Machinery Company, Cincinnati, Ohio

[21] Appl. No.: 903,271

[22] Filed: Sep. 3, 1986

[51] Int. Cl.$^4$ ............................................. B65G 19/08
[52] U.S. Cl. ..................................... 198/733; 198/852
[58] Field of Search ............... 198/733, 852, 831, 728, 198/731; 474/210, 226, 228, 230

[56] References Cited

U.S. PATENT DOCUMENTS

| | | | |
|---|---|---|---|
| 2,091,836 | 8/1937 | Sayers et al. | 474/210 |
| 2,600,174 | 6/1952 | Sheehan | 198/852 |
| 2,672,971 | 3/1954 | Joy | 198/733 X |
| 2,994,422 | 8/1961 | Dalrymple et al. | 198/733 |
| 3,093,235 | 6/1963 | Imse | 198/852 |
| 3,155,225 | 11/1964 | Krekeler | 198/733 |
| 3,324,990 | 6/1967 | Karlovsky, Jr. | 198/733 |
| 3,646,752 | 3/1972 | Kamfer | 198/852 X |
| 3,653,491 | 4/1972 | Safico, Jr. et al. | 198/733 |
| 3,957,153 | 5/1976 | Krekeler | 198/719 |
| 4,441,605 | 4/1984 | Ronco et al. | 198/733 X |

Primary Examiner—Kenneth J. Dorner
Assistant Examiner—José V. Chen
Attorney, Agent, or Firm—Frost & Jacobs

[57] ABSTRACT

An improved pusher-type chain for a conveyor of the type comprising an elongated base means having a bottom and upstanding side guides or flanges. The base means may be made up of two or more sections joined together end-to-end in such manner as to permit them to be shifted with respect to each other from side-to-side horizontally and vertically upwardly and downwardly about the juncture. The pusher-type chain is a continuous chain adapted to be driven so that one of its spans moves longitudinally along the upper surface of the base means bottom and between the side guides or flanges in a conveying direction so as to advance therealong the material being conveyed. The chain comprises a plurality of pusher elements normally extending substantially transversely of the conveying direction. Adjacent pusher elements are joined together by a series of block-like links and pairs of plate-like links arranged alternately and joined together and to the pusher elements by pintle means permitting vertical articulation. The plate-like links of selected pairs are provided with reliefs on their inside surfaces and the end of each block-like link adjacent such a relief is provided with a pintle hole elongated transversely of its axis, permitting horizontal articulation of the chain between its pusher elements.

12 Claims, 8 Drawing Sheets

PUSHER-TYPE CONVEYOR CHAIN

TECHNICAL FIELD

The invention relates to a continuous pusher-type conveyor chains having a plurality of spaced rigid pusher elements joined together by a series of alternate block-like links and pairs of plate-like links all connected by pintle means permitting vertical articulation, and more particularly to such chains wherein the plate-like links of selected pairs are configured to permit horizontal articulation between pusher elements.

BACKGROUND ART

While conveyors with which the chain of the present invention are intended to be used may have many applications, for purposes of an exemplary showing, such conveyors will be described with respect to their use in the mining industry, although their use is not intended to be so limited.

Pusher-type chain conveyors, as used in the mining industry, are found both in the form of separate conveying units, and as integral parts of continuous mining machines. A typical continuous mining machine, for example, is self-propelled and is provided at its forward end with cutting means shiftable in such a way that an entry is cut in the material being mined. The entry is so sized as to permit the passage of the mining machine therethrough. Since the cutting operation is a continuous one, it is necessary to provide means to move the cut material from in front of the mining machine and to convey it out of the entry. To this end, the mining machine usually incorporates several conveyors in its construction, the conveyors acting successively to transport the cut material rearwardly of the machine. Frequently, the mining machine further incorporates a "tail conveyor" which is a part of the mining machine, located at its rearward end. The purpose of the tail conveyor is to deliver the cut material to other conveying means by which it is removed from the entry. The other conveying means may comprise mine cars, portable belt conveyors, or the like.

The most frequently encountered form of tail conveyor, in association with a continuous mining machine, comprises a section of conveyor base means mounted on the mining machine body. One or more additional sections of conveyor base means are connected thereto end-to-end, and extend beyond the rearward end of the mining machine body. All of the base means sections are characterized by a bottom portion provided with longitudinally extending, upstanding side guides or flanges.

In order for the tail conveyor to perform its task properly, the various sections thereof must be capable of both lateral and vertical movement with respect to each other. This enables the cut material to be delivered to a desired point despite changes of position of the mining machine as it advances in the entry and changes in level of the entry floor. Similarly, this lateral and vertical movement capability of the conveyor sections enables the shifting of the desired delivery point for the material being mined, as required.

The tail conveyor incorporates a continuous pusher-type conveyor chain which is driven along the length of the conveyor base sections. The chain is normally provided with a plurality of rigid pusher elements, normally extending substantially transversely of the conveying direction. The pusher elements are located at spaced intervals along the chain. Adjacent pusher elements are joined together by a series of alternate block-like links and plate-like links. At one end of the tail conveyor, the continuous chain passes over a driven sprocket. At the other end of the conveyor, the chain passes over a driven or idler sprocket, or roller.

From the above description it will be apparent that the conveyor chain must not only be capable of bending in a vertical plane so as to follow the conveyor base sections and to pass over the sprockets, but also it must be capable of bending in a horizontal plane so as to track along the conveyor base sections when they are angularly related, one to another.

Prior art workers have developed numerous types of conveyor chains to meet these requirements. In general, such chains have comprised a plurality of links and interconnecting plates held together by horizontally disposed pintles. The laterally extending pusher elements have been affixed to or formed as a part of selected ones of the chain plates. A number of approaches have been taken to render such chains capable of double articulation (i.e., both vertical and horizontal or lateral). For example, chains have been produced, the parts of which are loosely fitting. Such chains, however, have been characterized by a minimum of horizontal articulation and have generally proven unsatisfactory and subject to excessive wear of the parts.

In another approach, selected ones of the block-like links of the chain have been made in two parts, pivoted to each other by a vertical pintles. Thus, a sort of universal joint is formed enabling the chain to deflect in the horizontal plane. This construction, however, has proven to have numerous drawbacks, including the fact that the necessarily abbreviated length and diameter of the vertical pintles has resulted in chain breakage.

In U.S. Pat. No. 3,155,225, a pusher-type chain is described wherein many of these problems have been overcome. The chain of this patent has special block-like connector links provided at the positions of the pusher elements. These special connector links have, at their adjacent ends, uniquely formed transverse pintle-receiving perforations. The pusher elements each comprise a pair of pushers joined together by a pair of pintles. Each of the pintles joining a pair of pusher elements passes through one of the uniquely formed transverse pintle-receiving perforations of the special connectors. The facing surfaces of the pusher elements of each pair are also specially configured so that the chain is capable of double articulation at the position of each pusher element, with a minimum of lost motion, a minimum of wear and without loss of strength.

U.S. Pat. No. 3,957,153 teaches yet another form of pusher-type conveyor chain with even greater horizontal articulation capabilities at the positions of the pusher elements. This patent teaches a pusher-type chain having pusher elements located at desired intervals along its length and joined together by a series of link elements. Centrally of each pusher element, there are forward and rearward extensions. Each of these extensions is provided with a transverse perforation of particular configuration and adapted to receive a generally U-shaped, strap-like link. Thus, each of the series of links located between adjacent pusher elements terminates at its ends in the above noted U-shaped, strap-like link engaging the adjacent pusher element.

The present invention is based upon the discovery that lateral or horizontal articulation can be achieved in those parts of a pusher-type chain between the pusher elements without the use of loose chain parts, universal joints or link elements made of flexible material. This is accomplished through appropriate configuration of selected ones at least of the pairs of plate-like links together with the pintel holes of adjacent block-like links. The teachings of the present invention can be incorporated in conventional pusher-type chains, or chains of the type taught in the above identified U.S. Pat. Nos. 3,155,225 and 3,957,153. Thus, when incorporated with the chains of the above mentioned patents, the resulting chain will be capable of vertical articulation throughout its length and horizontal articulation both at the pusher elements and therebetween.

DISCLOSURE OF THE INVENTION

According to the invention there is provided an improved pusher-type chain for a conveyor of the type comprising an elongated base means having a bottom and upstanding side guides or flanges. The base means is made up of two or more sections joined together end-to-end in such a way that they can be shifted with respect to each other both from side-to-side horizontally and vertically upwardly or downwardly.

The pusher-type chain of the present invention constitutes a contiuous chain adapted to be driven so that one of its spans moves longitudinally along the upper surface of the base means bottom and between the side guides or flanges of the conveyor sections in a conveying direction. The chain comprises a plurality of pusher elements normally extending substantially transversely of the conveying direction and joined together by a series of block-like links and pairs of plate-like links arranged alternately and joined together and to the flights by pintle means so that the chain is capable of vertical articulation throughout its length. Selected pairs of the plate-like links between the pusher elements are provided with reliefs on their inside surfaces. The end of each block-like link adjacent to such a relief is provided with a pintle hole elongated transversely of its axis. This arrangement permits horizontal articulation of the chain between flights.

In one embodiment of plate-like links, each plate-like link of a pair is provided with a relief on its inside surface extending substantially from one end of thereof with the relieved end of the link being of greater thickness than the non-relieved end. In a second embodiment, each plate-like link of a pair is similarly relieved on its inside surface and is provided with a continuous, planar outside surface. In a third embodiment of plate-like link pairs, each link of a pair is provided with a relief extending inwardly from both ends on its inside surface, forming a v-shaped relief when viewed in plan and providing articulation capability for both block-like links adjacent thereto. The relieved plate-like link pairs of the present invention can be used in various numbers and combinations between pusher elements to achieve various degrees of horizontal or lateral articulation capability. They may also be used with the pusher elements of U.S. Pat. No. 3,155,225 or the pusher elements and strap links of U.S. Pat. No. 3,957,153 for maximum articulation of the pusher chain.

DETAILED DESCRIPTION OF THE INVENTION

Figures 1, 11, 12, 13, 14:
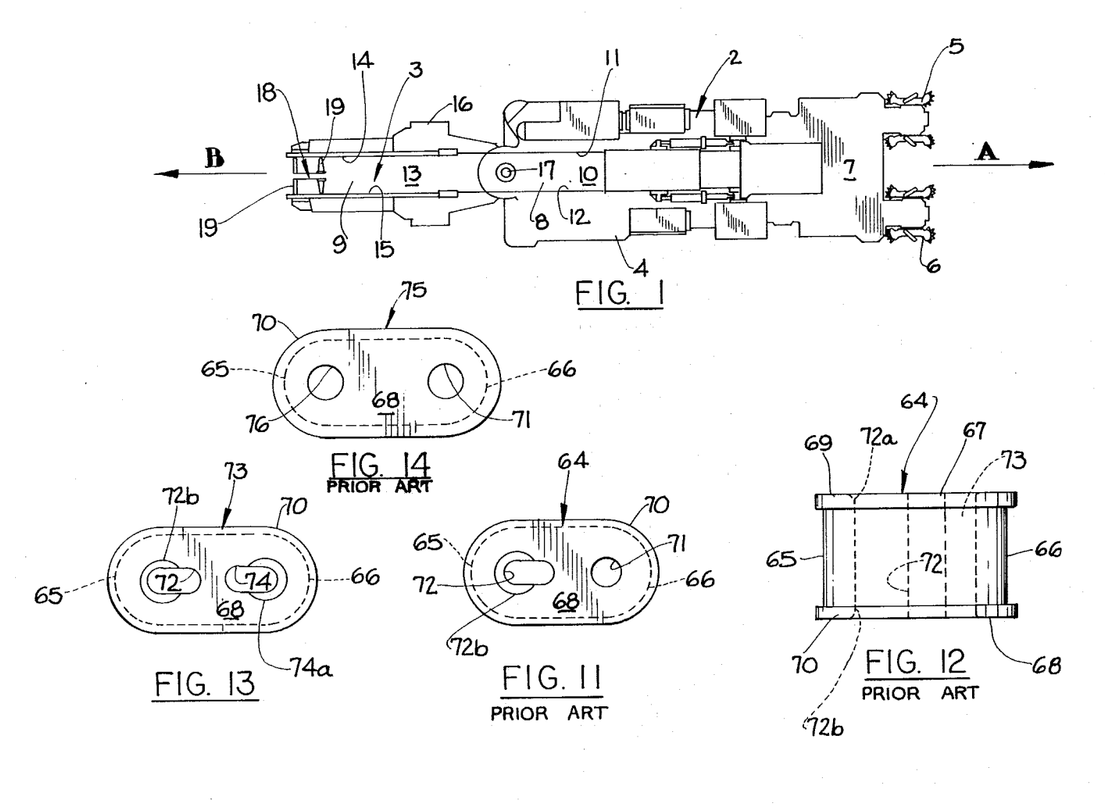
FIG. 1 is a semi-diagramatic plan view of a typical continuous mining machine having a tail conveyor utilizing a pusher-type conveyor chain.
FIGS. 11 and 12 are respectively a side elevational view and a plan view of a conventional block-like link having an elongated pintel hole at one end.
FIG. 13 is a side elevational view of a block-like link, similar to that of FIGS. 11 and 12, but having both pintel holes elongated in a direction transverse their axes.
FIG. 14 is a side elevational view of a conventional block-like link having two transverse pintle holes of circular cross section.

For a better understanding of the invention, reference is first made to FIG. 1, illustrating an exemplary environment for the pusher-type chains of the present invention. FIG. 1 diagramatically illustrates a typical continuous mining machine generally indicated at 2 and provided with a tail conveyor, generally indicated at 3. The mining machine has a body portion 4 which is usually mounted on wheels or treads and is self-propelled. At the forward end of the mining machine, cutting means are provided as shown at 5 and 6. These cutting means 5 and 6 may take various well known forms and are mounted on means such as the frame 7, enabling the cutting means to be shifted in such a way that they will cut an entry large enough to receive and to permit advancement of the mining machine 1 in the cutting direction indicated by arrow A.

By various well known conveying means, the cut material at the forward end of the mining machine is gathered and transported over or through the mining machine to the tail conveyor 3. This last mentioned conveyor comprises a conveyor base means, illustrated in FIG. 1 as made up of two sections 8 and 9. The base means section 8 has a bottom portion 10 and upstanding side guide or flanges 11 and 12. Similarly, the section 9 has a bottom portion 13 and upstanding side guides or flanges 14 and 15. The section 9 is mounted on a boom 16 articulated to the rearward end of the mining machine body 4 as at 17. The articulation is such that the boom 16 and its conveyor base means section 9 are shiftable with respect to the conveyor base means section 8 both in the vertical plane and the horizontal plane for reasons explained above. A pusher-type conveyor chain, generally indicated at 18, extends along the length of the conveyor base means sections 8 and 9 and is adapted to be driven along the upper surface of their bottom portions 10 and 13. It will be understood that the chain 18 is a continuous chain. Normally it will be driven by a sprocket (not shown) at at least one end of the tail conveyor 3.

The chain 18 is provided with a plurality of spaced pusher elements 19, extending substantially transversely of the conveying direction indicated by arrow B. It will be seen that the pusher elements extend to both sides of the chain 18 and that the pusher elements are located at intervals along the length of the chain.

Figure 2:
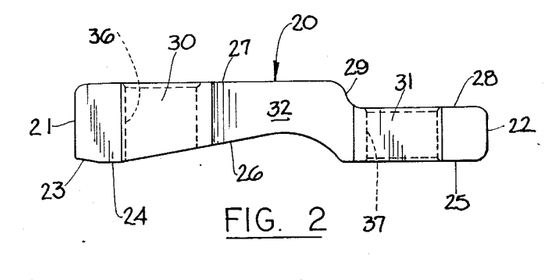
FIG. 2 is a plan view of one embodiment of a plate-type link of the present invention.
Figure 3:
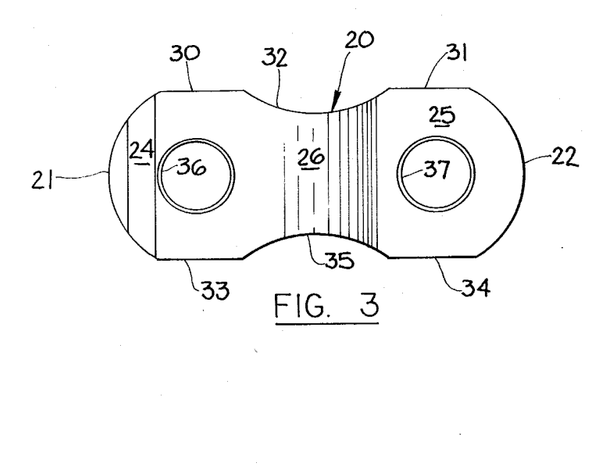
FIG. 3 is an inside elevational view of the link of FIG. 2.
Figure 4:
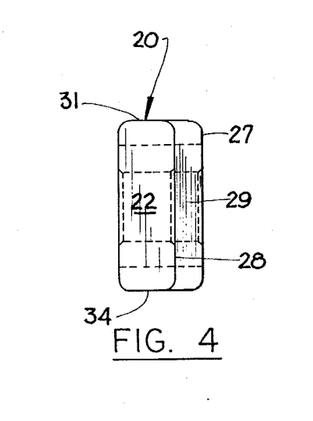
FIG. 4 is an end view of the link of FIG. 3, as viewed from the right of that Figure.

To assure a thorough understanding of the chains of the present invention, the individual parts used to make up the chains will be next described in detail. Reference is first made to FIGS. 2, 3 and 4 in which an exemplary plate-like link of the present invention is generally indicated at 20. In all of the figures, like parts have been given like index numerals. Plate-like links of the type illustrated in FIGS. 2 through 4 are always used in pairs, as is shown, for example, in FIG. 14. The plate-like link 20 has two ends, 21 and 22. The inside surface of link 20, adjacent to end 21 is provided with a relief 23. The relief 23 is followed by a narrow planar surface 24. Adjacent the end 22 of link 20, the inside surface 25 is planar. In fact, the surfaces 24 and 25 are coplanar. Between surfaces 24 and 25, there is an inwardly extending relief 26. The purpose for this relief will be apparent hereinafter. The exterior surface of link 20 comprises a first planar surface 27 parallel to inside surface 24, and a second planar surface 28 parallel to inside surface 25. The outside surfaces 27 and 28 are joined by a transition surface 29.

As is most clearly seen in FIG. 3, the ends 21 and 22 of link 20 are rounded. One longitudinal edge of the link comprises two coextensive surfaces 30 and 31, joined by an arcuate surface 32. The other longitudinal edge of the link similarly comprises a pair of coextensive surfaces 33 and 34, joined by an arcuate surface 35. Depending upon its orientation in use, the link 20 will ride along the upper surfaces of the bottom portions 10 and 13 of conveyor sections 8 and 9 either on its surfaces 30 and 31 or its surfaces 33 and 34. To complete the structure of link 20, a pair of pintle holes 36 and 37 are provided near its ends 21 and 22, respectively. It will be noted that relief surface 26 starts at about that peripheral edge of pintle hole 36 nearest link end 21.

Figure 5:
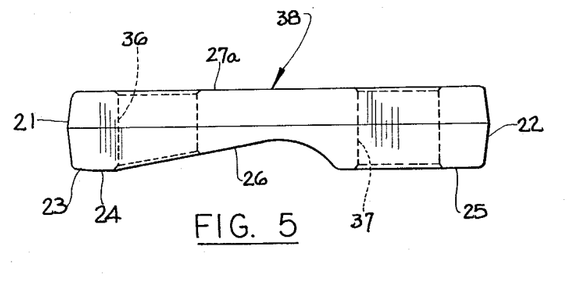
FIG. 5 is a plan view of another embodiment of plate-like link of the present invention.

FIG. 5 illustrates another embodiment of plate-like link, similar to link 20 of FIGS. 2 through 4. This second embodiment is generally indicated at 38. This embodiment is substantially identical to the link 20, and like parts have been given like index numerals. The primary difference between link 30 and link 20 lies in the fact that its outside or exterior surface 27a is planar throughout the length of the link. Link 38 could be used instead of link 20 in pusher chains requiring some greater strength.

Figure 6:
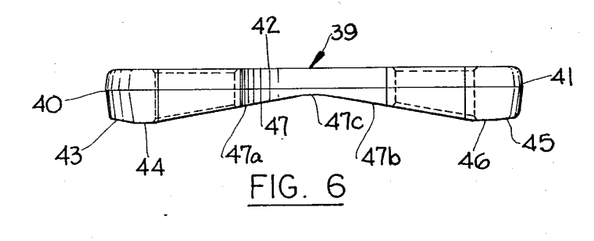
FIG. 6 is a plan view of yet another plate-like link of the present invention.
Figure 7:
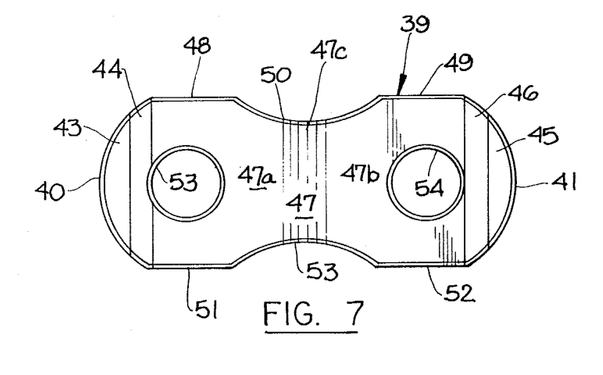
FIG. 7 is an inside elevational view of the link of FIG. 6.
Figures 8, 10:
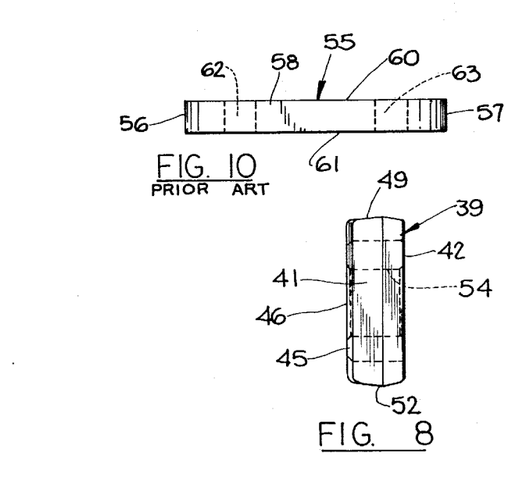
FIG. 8 is an end view of the link of FIG. 7, as viewed from the right of that figure.
FIGS. 9 and 10 are respectively a side elevational view and a plan view of a conventional plate-like link.

Another form of plate-like link is generally indicated at 39 in FIGS. 6, 7 and 8. The plate-like link 39 is an elongated member having ends 40 and 41 and an outside or exterior surface 42 which is planar throughout the length of the link. The inside surface of the link comprises a plurality of surfaces. Starting at the end 40, the link is relieved as at surface 43, followed by a surface 44 parallel to the exterior surface 42. In similar fashion, at the end 41 of the link, the inside surface has a first relief surface 45, similar to relief surface 43, followed by a surface 46 which is also parallel to exterior surface 42. Surfaces 44 and 46 are coplanar. The surfaces 44 and 46 are joined by a V-shaped relief surface 47. Relief surface 47 comprises a first portion 47a extending from surface 44 toward exterior surface 42. Relief surface 47 also has a portion 47b extending from surface 46 toward exterior surface 42. Portions 47a and 47b are joined by a gentle arcuate portion 47c located at the longitudinal center of the plate-like link 39.

Referring to FIG. 7, it will be noted that the ends 40 and 41 of link 39 are rounded, as are the ends 21 and 22 of the embodiment of FIG. 3 and the embodiment of FIG. 5. The upper edge of link 39, as viewed in FIG. 7, comprises two coextensive surfaces 48 and 49, joined by an arcuate surface 50. The surfaces 48, 49 and 50 are equivalent to the surfaces 30, 31 and 32 of FIG. 3. Similarly, the lower edge of plate-like link 39, as viewed in FIG. 7, is also made up of coextensive surfaces 51 and 52, joined by an arcuate surface 53. The surfaces 51, 52 and 53 are equivalent to the surfaces 33, 34 and 35 of FIG. 3. Furthermore, they are equivalent to the surfaces 48, 49 and 50 of the upper edge of plate-like link 39. Again, depending upon the orientation of link 39 in use, the surfaces 48 and 49 or the surfaces 50 and 51 travel along the upper surfaces of the bottom portions 10 and 13 of conveyor sections 8 and 9. To complete the plate-like link 39, a pair of pintle holes 53 and and 54 are located near the link ends 40 and 41, respectively. It will be noted that relief surface portions 47a and 47b begin at about those peripheral portions of pintle holes 53 and 54 nearest link ends 40 and 41, respectively.

Figure 9:
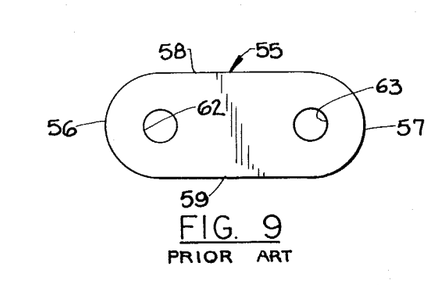

As will be explained hereinafter, in some of the chain arrangements of the present invention, conventional prior art plate-like links are employed. Such a link is illustrated in FIGS. 9 and 10. The conventional link is generally indicated at 55. The link comprises an elongated member having rounded ends 56 and 57, substantially planar and parallel upper and lower edges 58 and 59 (as viewed in FIG. 9) together with parallel sides 60 and 61, both of which are planar throughout the length of the link. The link is provided with pintle holes 62 and 63 located adjacent ends 56 and 57, respectively. Depending upon the orientation of plate-like link 55 in use, either the edge surface 58 or the edge surface 59 will travel along the top surface of the bottom portions 10 and 13 of conveyor sections 8 and 9.

As indicated above, the chain of the present invention also utilize block-like links. Preferably, the block-like links are similar to those taught in U.S. Pat. No. 3,155,225. Such a block-like link is generally indicated at 64 in FIGS. 11 and 12. The link 64 comprises an elongated block having rounded ends 65 and 66, as well as planar, parallel sides 67 and 68. While not required, the block-like link 64 may be provided with flange-like edges along portions of which it rides on the upper surfaces of the bottom portions 10 and 13 of conveyor sections 8 and 9. Near the end 66, the block-like link 64 is provided with a transverse hole 71 adapted to receive a pintle. It is further provided with a second transverse hole 72 near its end 65. The transverse hole 72 differs from the hole 71 in that it is elongated toward the hole 71 and transverse its axis. Furthermore, the hole 72 is radiused as at 72a and 72b. The purpose for the elongation of hole 72 will be apparent hereinafter.

In certain of the chain embodiments of the present invention a special block-like link is used. Such a special block-like link is generally indicated at 73 in FIG. 13. The block-like link 73 is similar to the block-like link 64 of FIGS. 11 and 12, and like parts have been given like index numerals. Link 73 differs from link 64 only in that the perforation 71 of link 74 has been replaced by a perforation 74, identical to the perforation 72, and provided with radiused portions on both sides of the link, one such portion being shown at 74a.

FIG. 14 illustrates yet another type of block-like link usable in the chains of the present inventions. The link is generally indicated at 75 and is conventional, having been shown, for example, in the above mentioned U.S. Pat. No. 3,155,225. Block-like link 75 is substantially similar to the link 64 of FIGS. 11 and 12, and like parts have been given like index numerals. The link differs from link 64 of FIGS. 11 and 12 only in that both pintle holes 71 and 76 are identical and of circular cross section.

The pusher elements of the chain of the present invention are also conventional. For a better understanding of the nature of the present invention, two exemplary prior art pusher elements are illustrated in FIGS. 15 through 18.

Figure 15:
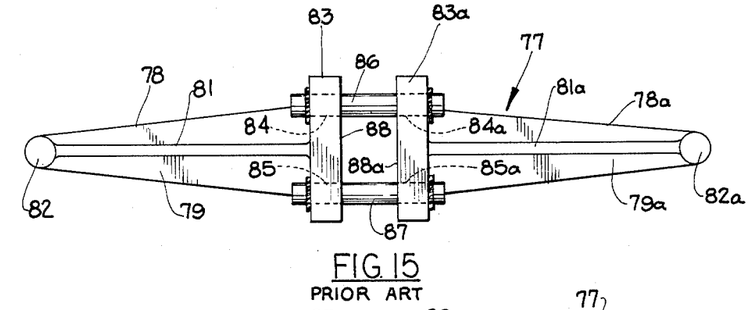
FIG. 15 is a plan view of an exemplary pusher element.
Figure 16:
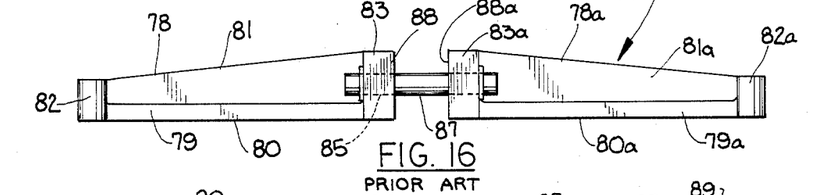
FIG. 16 is an elevational view of the pusher element of FIG. 15.

Reference is first made to FIGS. 15 and 16 wherein the pusher element is generally indicated at 77. The pusher element 77 is made up of two identical pusher members 78 and 78a. Pusher member 78 comprises an elonaged body 79 having a flat, planar bottom surface 80. The body 79 has a central rib or web 81 acting as a pusher for the material being conveyed. The outer free end of pusher member 78 is provided with a rounded knob-like portion 82 which can ride against side guide elements 11, 12, 14 and 15 associated with conveyor sections 8 and 9. The opposite end of pusher member 78 is provided with a base 83 which is similar in configuration to the conventional plate-like link 55 of FIGS. 9 and 10, provided with pintle holes 84 and 85.

The pusher member 78a is identical to pusher member 78, and like parts have been given the same index numeral followed by "a".

It will be noted that pusher members 78 and 78aare joined together by pintles 86 and 87 which pass through pintle perforations 84-84a and 85-85a, respectively. The pintles are preferably welded in place, as shown. It will be noted that the facing base portion surfaces 88 and 88a are planar and are maintained in parallel spaced relationship by pintles 86 and 87. The pusher members 78 and 78a of pusher element 77 can each be a weldment fabricated of individual parts. Preferably, however, each of the pusher members 78 and 78a constitute a one-piece, integral, cast member. It will be understood that those links of the pusher chain which are engaged upon pintles 86 and 87 are located thereon during the location and welding of pintles 86 and 87.

Figure 17:
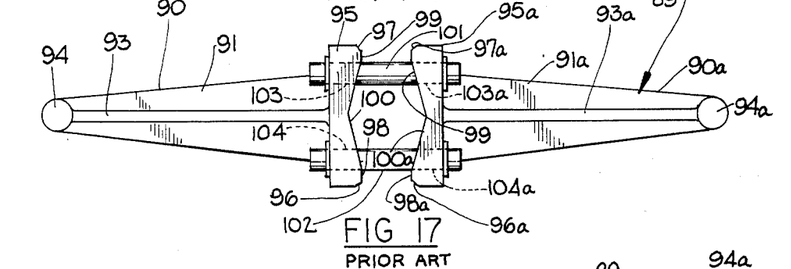
FIG. 17 is a plan view of another exemplary pusher element.
Figure 18:
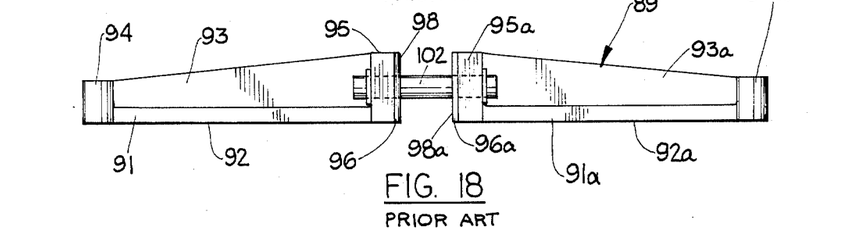
FIG. 18 is an elevational view of the pusher element of FIG. 17.

FIGS. 17 and 18 illustrate a pusher of the type taught in the above noted U.S. Pat. No. 3,155,225. The pusher element is generally indicated at 89 and is made up of a pair of pusher members 90 and 90a. Pusher member 90 is similar to pusher member 78 of FIGS. 15 and 16, having an elongated body 91 with a flat, planar bottom surface 92 and a pusher web or rib 93 with a knob-like free end 94 and a base portion 95.

The primary difference between pusher member 90 of FIGS. 17 and 18 and pusher member 78 of FIGS. 15 and 16 lies in the fact that the base portion 95 is configured somewhat similarly to the plate-like link 39 of FIGS. 6, 7 and 8. To this end, the inside surface of base portion 95 has at its ends relief surfaces 96 and 97. The relief surfaces 96 and 97 are respectively followed by surfaces 98 and 99 which are coplanar and parallel to the planar opposite surface of the base member 95. The surfaces 98 and 99 are joined by a V-shaped relief surface 100.

Pusher member 90a is identical to pusher member 90 and like parts have been given like index numerals followed by "a".

Pusher members 90 and 90a are joined together by pintles 101 and 102, passing through pintle perforations 103–103a and 104–104a, respectively. In this instance, the base member surfaces 98–99 and 98a–99a are maintained in parallel spaced relationship by the pintles 101 and 102, which are preferably welded to base portions 95 and 95a, as shown. Again it will be appreciated that links mounted on pintles 101 and 102 will be so located prior to completion of the fabrication of pusher element 89. It will further be noted that relief surface 100 has its ends at about those peripheral portions of pintle holes 103 and 104 nearest the ends of base portion 95. The same is true of relief surface 100a.

Figure 19:
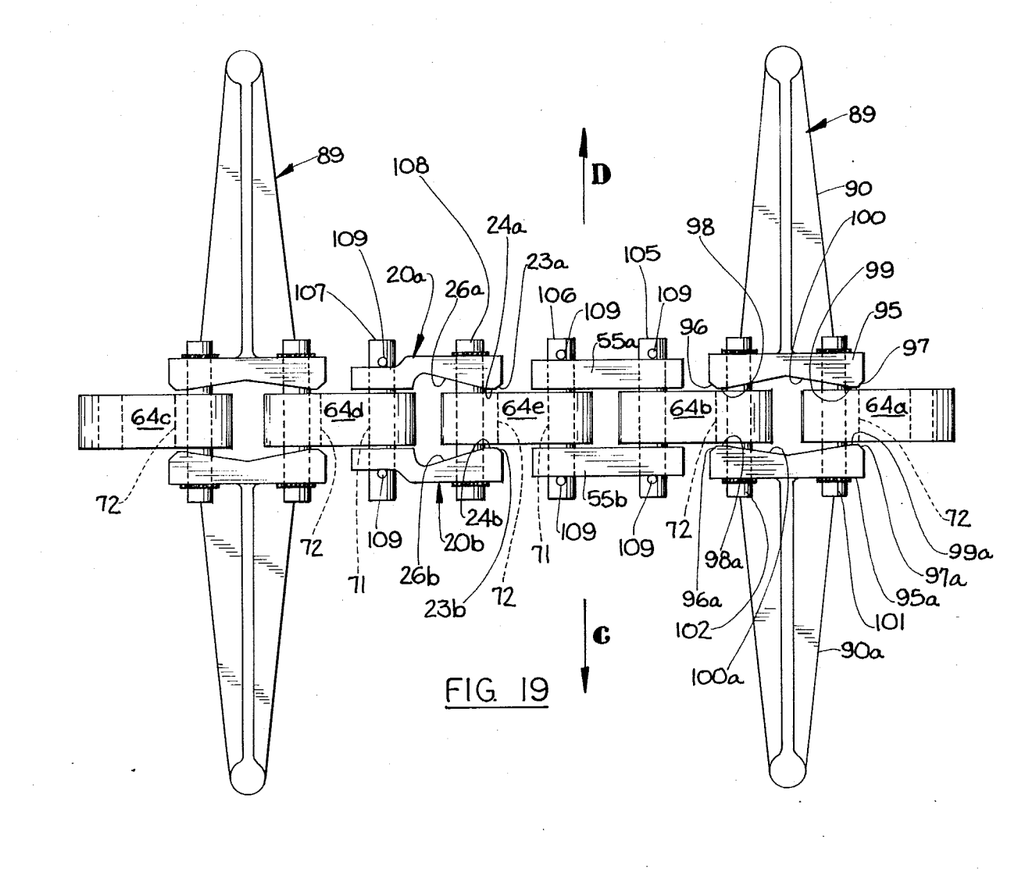
FIGS. 19 through 22 are plan views of segments of pusher chains including two adjacent pusher elements, and illustrating various exemplary combinations of parts achievable in the practice of the present invention to acquire various degrees of articulation of the pusher chain.

All of the individual elements of the chains of the present invention having been described in detail, various chain arrangements will now be disclosed. Reference is first made to FIG. 19. At the right hand end of that Figure, a pusher element 89 is provided, identical to the pusher element 89 of FIGS. 17 and 18, and like parts have been given like index numerals. The pintles 101 and 102 mount block-like links 64a and 64b (identical to the block-like link 64 of FIGS. 11 and 12) passing through the elongated link perforations 72 thereof. It will be immediately apparent that the link 64a mounted on pintle 101 can shift laterally in the direction of arrow C by virtue of the elongated pintle hole 72 and the relief 100 on pusher member 90 and the relief 97a on pusher member 90a. Similarly, the same link can shift laterally in the direction of arrow D by virtue of the relief 100a on pusher member 90aand the relief 97 on pusher member 90. Similarly, that block-like link 64b mounted on pintle 102 can shift laterally in the direction of arrow C by virtue of relief 100 on pusher member 90 and relief 96a on pusher member 90a, or laterally in the direction of arrow D by virtue of relief 100a of pusher member 90a and relief 96 of pusher member 90. This last mentioned shifting is also made possible by virtue of the elongated pintle hole 72 in link 64b. As a consequence, horizontal articulation in either lateral direction can be achieved by both block-like links 64a and 64b. This type of horizontal double articulation at the pusher element 89 is taught in the above mentioned U.S. Pat. No. 3,155,226.

At the other end of the segment illustrated in FIG. 19 (the left hand end), another pusher element 89 is shown, together with two block-like links 64c and 64d. It will be understood that horizontal double articulation will occur at this pusher element as well, in the same manner described with respect to the first mentioned pusher element.

Block-like link 64b attached to pusher element pintle 102 is also attached by a pintle 105 to a pair of plate-like links 55a and 55b, identical to plate-like link 55 of FIGS. 9 and 10. No horizontal articulation is available at pintle 105. The plate-like links 55a and 55b are, in turn, attached to another block-like link 64e, identical to the other block-like links 64a-64d, by pintle 106. Since the pintle 106 passes through the hole 71 of circular cross section in block-like link 64e, no horizontal articulation will occur at pintle 106.

Block-like link 64d is connected by pintle 107 to a pair of plate-like links 20a and 20b, identical to plate-like link 20 of FIGS. 2 through 4. Since pintle 107 passes through the perforation 71 of circular cross section in block-like link 64d, no horizontal articulation is available at pintle 107.

The chain segment is completed by pintle 108 which joins the plate-like links 20a and 20b to the block-like link 64e. Pintle 108 passes through the elongated perforation 72 of link 64e. It will be apparent from FIG. 19 that by virtue of the elongated pintle hole 72 of link 64e, the relief 26a of plate-like link 20a and the relief 23b of plate-like link 20b, link 64e can shift laterally in the direction of arrow C. Similarly, by virtue of the elongated pintle hole 72 of link 64e and the relief 26b of link 20b and the relief 23a of link 20a, the link 64e can shift laterally in the direction of arrow D. Thus, at the position of pintle 108, link 64e is capable of horizontal, lateral articulation in either direction. By virtue of this, in the chain segment illustrated in FIG. 19, horizontal double articulation can take place at both pusher elements 89, and additional horizontal articulation in either direction can also take place at pintle 108.

While not intended to be so limited, excellent results have been achieved in the use of a chain wherein the parts and the elongated holes 72 of block-like link 64a through 64c are so sized, and the relief surfaces on plate-like links 20a and 20b and on the pusher elements 89 are so configured that each block-like link capable of horizontal articulation with respect to its respective pintle is capable of articulation of about 12° in either horizontal direction. In all of the embodiments of the present invention, satisfactory results have been achieved wherein all links capable of horizontal articulation can shift about 12° in either horizontal direction. Since all of the links and pusher elements are joined together by pintle means, it will be apparent that articulation in a vertical sense is possible at each pintle, enabling the chain to travel uphill and downhill, as well as about sprocket means, rollers and the like.

It will be noted that pintles 105, 106 and 107 are held in place by pins 109 which pass through transverse perforations in these pintles. It will be noted further, however, that the pintle 108 and those pintles associated with pusher elements 89 are welded in place. While not intended to be so limited, it is preferred that those pintles at which horizontal articulation takes place be welded in position. This is true of the embodiments of FIGS. 20 through 22 as well, these embodiments to be described hereinafter. Finally, it will be apparent to one skilled in the art that plate-like links similar to the link 38 of FIG. 5 could be substituted for links 20a and 20b and would function in the same manner. It will further be understood that the entire chain represented by FIG. 19 would be made up of the same elements in the arrangement as illustrated.

Figure 20:
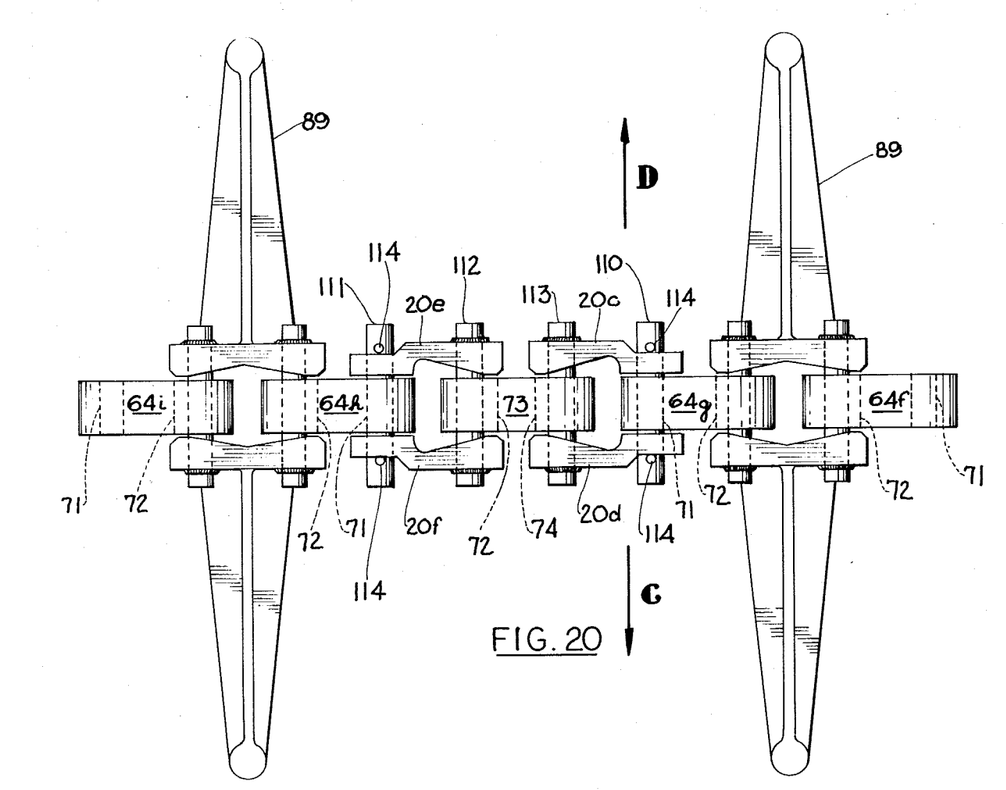

Reference is now made to FIG. 20. In the arrangement of FIG. 20, a pair of pusher elements 89, similar to the pusher element 89 of FIGS. 17 and 18, are provided. Each pusher element 89 is affixed to a pair of block-like links 64f-64g, 64h-64i, identical to the block-like link 64 of FIGS. 11 and 12. This much of the arrangement of FIG. 20 is identical to FIG. 19 and horizontal double articulation is achievable at both pusher elements 89, as has been described with respect to FIG. 19.

Block-like link 64g is affixed to the pair of strap-like links 20c and 20d by a pintle 110 passing through the links 20c and 20d and through the perforation 71 (of circular cross section) in link 64g. In similar fashion, a second pair of plate-like links 20e and 20f, identical to link 20 of FIGS. 2 through 4, are affixed to block-like link 64h by pintle means 111 passing through pintle perforations in the links 20e and 20f and the pintle perforation 71 of circular cross section in block-like link 64h. It will be noted that the pair of plate-like links 20c and 20d are oppositely oriented with respect to the plate-like links 20e and 20f. These link pairs 20c-20d and 20e-20f are joined together by a block-like link 73, identical to block-like link 73 of FIG. 13. It will be noted that link 73 has two elongated pintle holes 72 and 74 through which pintles 112 and 113 pass. It will be understood that link 73 is suitable in both lateral or horizontal directions C and D with respect to links 20c and 20d in the same manner described with respect to link 64e and links 20a and 20b of FIG. 19. In an identically similar manner, link 73 is also shiftable in both lateral or horizontal directions C and D with respect to the pair of plate-like links 20e and 20f. It will be understood that if link 73 is shiftable in either horizontal direction C or D with respect to the pair of plate-like links 20c or 20d by about 12° and if the same is true with respect to its ability to shift with respect to the pair of plate-like links 20e and 20f, the chain will be capable of a total articulation in either horizontal direction C or D of about 24° at about its mid-point between pusher elements 89. Thus, the chain segment of FIG. 20 is capable of greater articulation than that of FIG. 19. Again, vertical articulation is achievable at all of the pintles. Preferably, the pusher element pintles and pintles 112 and 113 are held in place by welding, while pintles 110 and 111 are preferably held in place by transverse pins 114. It will be understood that plate-like links 20c, 20d, 20e and 20f could be of the type illustrated at 38 in FIG. 5.

Figure 21:
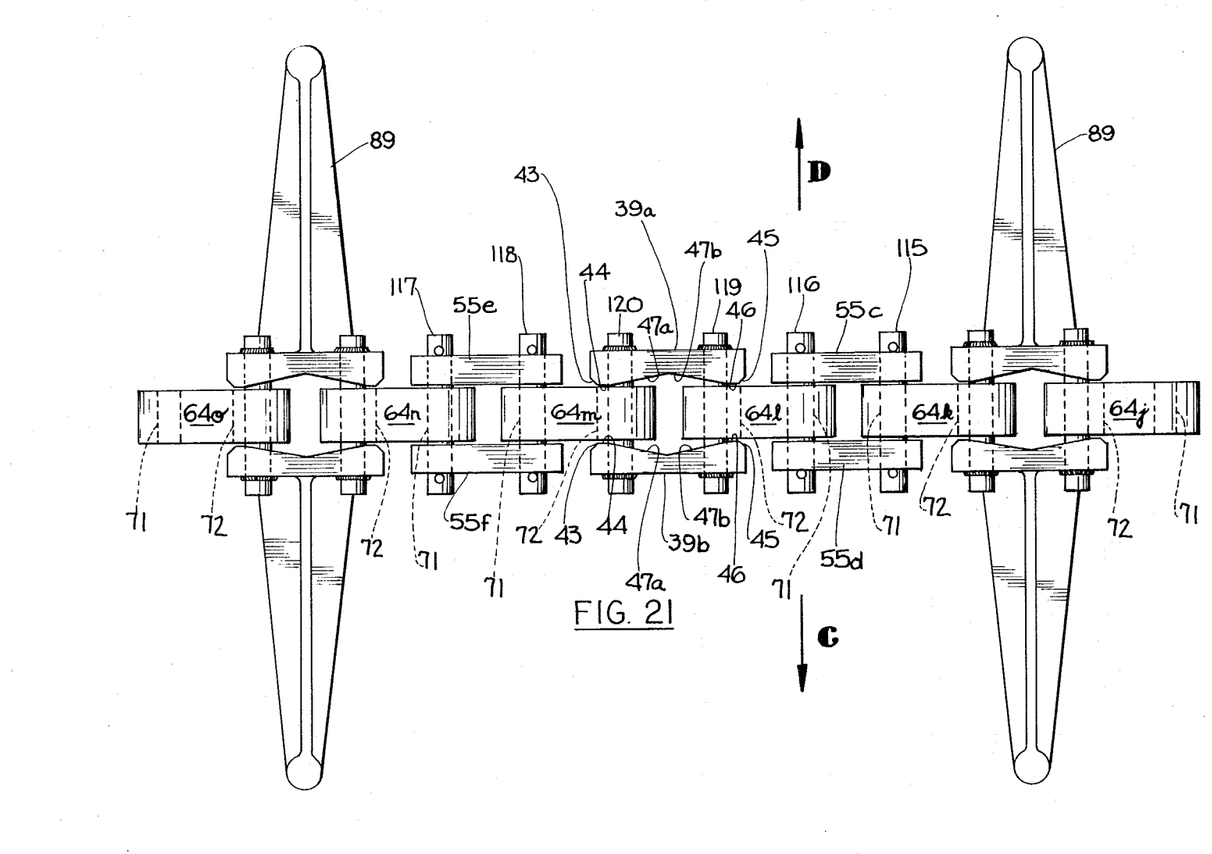

Yet another arrangement of chain parts is illustrated in FIG. 21. Once again, for purposes of an exemplary showing the chain segment of FIG. 21 is illustrated as being provided with pusher elements 89, identical to pusher element 89 of FIGS. 17 and 18. The pusher elements 89 are joined by their pintles to block-like links 64j-64k and 64n-64o, respectively. Double horizontal articulation can occur with respect to these elements at the pusher element pintles in the manner described with respect to FIG. 19. Block-like link 64k is connected to the next block-like link 64l by plate-like links 55c and 55d. To accomplish this, pintles 115 and 116 are used. It will be noted that the pintles 115 and 116 pass through those perforations 71 of circular cross section in block-like links 64k and 64l. Thus, no horizontal articulation will occur at pintles 115 and 116. In a similar fashion, the block-like link 64n is connected to the next adjacent block-like link 64m by a pair of plate-like links 55e and 55f through the agency of pintles 117 and 118. Pintles 117 and 118 pass through those perforations 71 of links 64n and 64m having a circular cross section. No horizontal articulation occurs at pintles 117 and 118. Block-like links 64l and 64m are joined by pintles 119 and 120 to plate-like links 39a and 39b. Block-like link 64l can shift horizontally in the direction of arrow C by virtue of relief surfaces 47b and 45 on plate-like links 39a and 39b, respectively. Link 64l can shift horizontally in the direction of arrow D by virtue of relief surfaces 47b and 45 on links 39b and 39a, respectively. Similarly, block-like link 64m can shift horizontally in the direction of arrow C by virtue of relief surfaces 47a and 43 of plate-like links 39a and 39b respectively. Link 64m can shift horizontally in the direction of arrow D by virtue of relief surfaces 47a and 44 of links 39b and 39a, respectively. Thus double articulation in the horizontal directions C and D is achieved in the embodiment of FIG. 21, as in the case of FIG. 20. In FIG. 21, however, this is accomplished by a different combination of links and the distance between pusher elements 89 is greater. If each block-like link 64l and 64m is capable of about 12° articulation in each horizontal direction C and D, then a total of about 24° articulation in the direction of arrow C or the direction of arrow D is achievable at the midpoint of the segment between pusher elements 89.

In the embodiment of FIG. 21, full vertical articulation is available throughout the chain since the pusher elements and various links are joined together by pintles. Again, pintles 119 and 120, together with the pusher element pintles, are needed.

Figure 22:
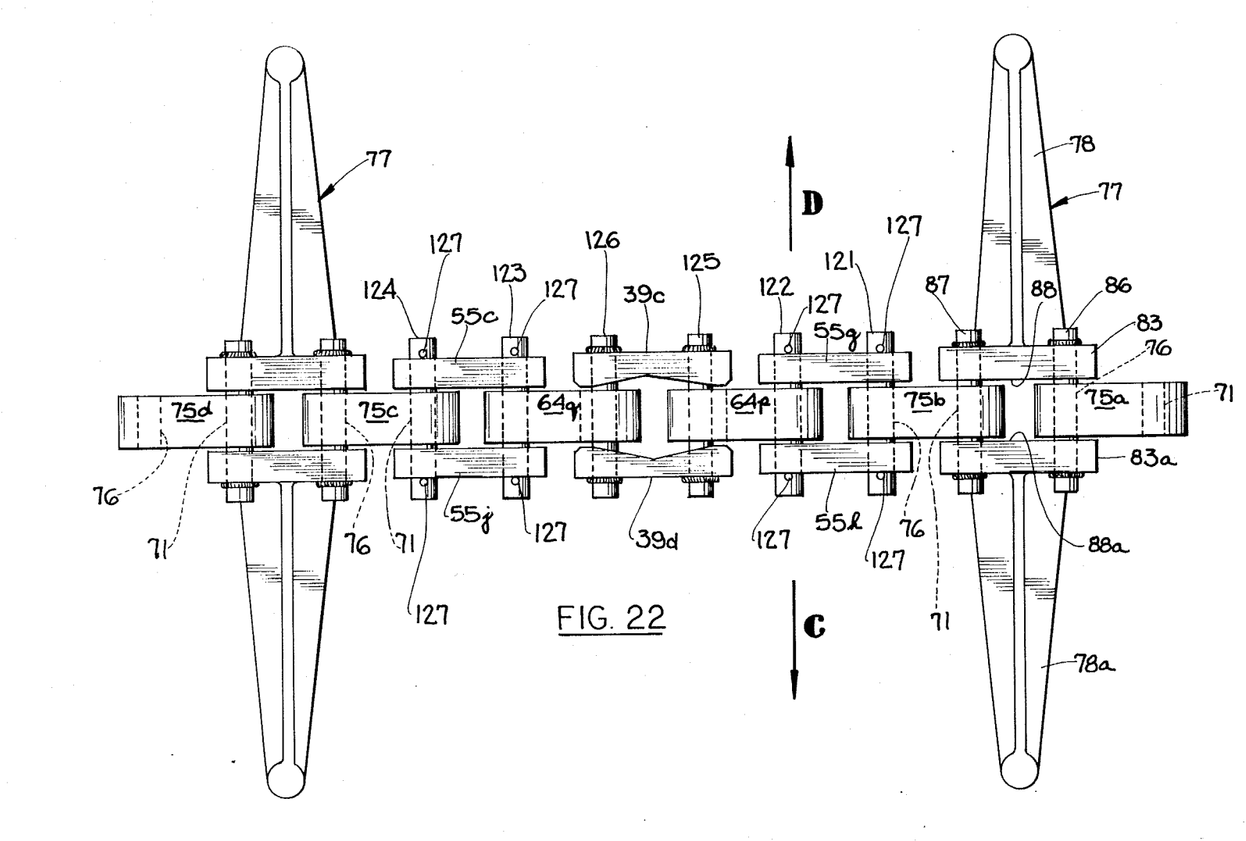

Yet another exemplary combination of elements is illustrated in FIG. 22. FIG. 22 is similar to the structure shown in FIG. 21, differing primarily in that FIG. 22 utilizes pusher elements 77 of the type illustrated in FIGS. 15 and 16. At the right-hand end of FIG. 2, the pusher element 77 comprises pusher members 78 and 78a maintained in parallel spaced relationship by the welded pintles 86 and 87. The base portions 83 and 83a of pusher members 78 and 78a have parallel facing surfaces 88 and 88a. Mounted on pintles 86 and 87 there is a pair of block-like links 75a and 75b, identical to the link 75 of FIG. 14, having circular pintle holes 71 and 76. At the left-hand end of FIG. 2, there is an identical pusher element 77 with associated links 75c and 75d, again identical to the link 75 of FIG. 14.

The remainder of the link arrangement between links 75b and 75c is identical to that shown in FIG. 21 between links 64k and 64n. To this end, the link 75b is connected to block-like link 64p (identical to link 64 of FIGS. 11 and 12) by a pair of plate-like links 55g and 55h, together with pintles 121 and 122. Similarly, block-like link 75c is connected to block-like link 64q (identical to block-like link 64 of FIGS. 11 and 12) by plate-like links 55i and 55j (equivalent to plate-like link 55 of FIGS. 9 and 10) together with pintles 123 and 124. Block-like links 64p and 64q are joined together by plate-like links 39c and 39d (identical to plate-like link 39 of FIGS. 6 through 8), and by pintles 125 and 126.

It will be apparent from FIG. 22 that no horizontal articulation is achievable at the pusher elements 77 or at pintles 121, 122, 123 or 124. Double articulation in the direction of arrow C and in the direction of arrow D can occur in association with plate-like links 39c and 39d about pintles 125 and 126, in the same manner described with respect to links 39a and 39b and pintles 119 and 120 of FIG. 21. Thus, in the embodiment of FIG. 22, articulation occurs only mid-way between pusher elements 77. Full vertical articulation is achievable throughout the chain, since the chain elements are joined together by pintles. While not required, it is preferred that pintles 125 and 126 be welded to plate-like links 39c and 39d, while links 121 through 124 are held in place by transverse pins 127. It would be within the scope of the invention to replace links 55c, 55d, 55e and 55f with links of the type shown in FIGS. 2 or 5 and to replace links 64l and 64m with links of the type shown in FIG. 13 for even greater articulation. It would also be possible to substitute pusher elements 89 for pusher elements 77 and to replace links 75a, 75b, 75c and 75d with links of the type shown in FIG. 11.

From the above description it will be apparent that with the use of a minimum number of parts, pusher chains can be assembled having varying degrees of articulation and various spacings between adjacent pusher elements. In all of the embodiments, those inside surface portions of the plate-like links and the pusher elements which are coplanar tend to guide the chain while moving along a rectilinear path of travel. In the use of plate-like link elements of the type shown in FIGS. 2 through 5 articulation in both horizontal directions can be achieved between a pair of such links and one of the two block-like links connected thereto by pintles. With the use of a pair of plate-like links of the type shown in FIGS. 6 through 8, double articulation can occur, in the sense that both block-like links connected to a pair of plate-like links 42 by pintle means, are shiftable in both horizontal directions C and D.

Modifications may be made in the invention without departing from the spirit of it. It will be understood that the embodiments illustrated in FIGS. 19–22 are exemplary only of the combinations achievable with the plate-like links of the present invention. Other combinations are available. For example, the pusher elements 77 of FIG. 22 could be replaced by pusher elements of the type shown at 89 in FIGS. 19, 20 and 21. Alternatively, the embodiments shown in FIGS. 19, 20 and 21 could be provided with pusher elements 77 of the type shown in FIG. 22. Furthermore, pusher elements and strap links of the type taught in the above noted U.S. Pat. No. 3,957,153 could be used in chains employing the plate-like links of the present invention. Furthermore, conventional universal links could be employed in conveyor chains utilizing the plate-like link elements of the present invention. For example, in the embodiment of FIG. 22, the block-like links 75b and 75c could be replaced by conventional universal links.

What is claimed is:

1. An improved pusher-type conveyor chain for a conveyor of the type comprising at least two elongated sections each having a bottom with an upper surface and parallel longitudinal edges with upstanding flanges extending along said edges, said conveyor sections being joined together end-to-end such that they can be shifted with respect to each other in lateral horizontal directions and vertical directions upwardly and downwardly, said pusher-type chain being continuous and being adapted to be driven in a conveying direction along each conveyor section bottom upper surface whereby to advance therealong material to be conveyed, said chain comprising a plurality of pusher elements normally extending substantially transversely of said conveying direction, adjacent pusher elements being joined together by a series of block-like links having transverse pintle holes near their ends and pairs of identical plate-like links having transverse pintle holes near their ends, said block-like links and said plate-like link pairs being arranged alternately with their adjacent pintle holes aligned and joined together by pintles passing through said aligned pintle holes, the improvement comprising the plate-like links of at least one pair thereof, located between each adjacent pair of pusher elements, having opposed inside surfaces with reliefs formed thereon, said plate-like links of said at least one relieved pair each comprises an elongated member having a long axis, first and second ends, inside and exterior surfaces, and first and second longitudinal edges, said first and second transverse pintle holes being near said first and second ends respectively, said inside surface of said link having a first relief surface portion adjacent said first end angled outwardly toward said first end, said first relief portion being followed by a second surface portion parallel to the long axis of said link, said second surface portion being followed by a third relief surface portion beginning at about that peripheral portion of said first pintle hole nearest said first end and angled therefrom toward said exterior surface of said link, said third relief surface portion terminating in a transition portion near said second pintle hole, said inside surface of said link having a fourth surface portion extending from said transition portion to said second link end and being coplanar with said second surface portion, one of said block-like links joined to said relieved pair of plate-like links is connected thereto by a pintle passing through said first pintle holes of said relieved pair of plate-like links and an elongated pintle hole in said last mentioned block-like link which is capable of horizontal articulation in both directions by virtue of said elongated pintle hole and said first and third relief surface portions on said plate-like links of said pair, whereby horizontal articulation of said chain is provided between its pusher elements at at least one selected pintle but not at all of said pintles.

2. The pusher-type chain claimed in claim 1 including more than one pair of plate-like links with said reliefs thereon between adjacent pusher elements.

3. The pusher-type chain claimed in claim 1 wherein said pusher elements are of such construction that the links joined directly thereto are capable of horizontal articulation.

4. The pusher-type chain claimed in claim 1 wherein said pusher elements are of such construction that the links joined directly thereto are precluded from horizontal articulation.

5. An improved pusher-type conveyor chain for a conveyor of the type comprising at least two elongated sections each having a bottom with an upper surface and parallel longitudinal edges with upstanding flanges extending along said edges, said conveyor sections being joined together end-to-end such that they can be shifted with respect to each other in lateral horizontal directions and vertical directions upwardly and downwardly, said pusher-type chain being continuous and being adapted to be driven in a conveying direction along each conveyor section bottom upper surface whereby to advance therealong material to be conveyed, said chain comprising a plurality of pusher elements normally extending substantially transversely of said conveying direction, adjacent pusher elements being joined together by a series of block-like links having transverse pintle holes near their ends and pairs of identical plate-like links having transverse pintle holes near their ends, said block-like links and said plate-like link pairs being arranged alternately with their adjacent pintle holes aligned and joined together by pintles passing through said aligned pintle holes, the improvement comprising the plate-like links of at least one pair thereof, located between each adjacent pair of pusher elements, having opposed inside surfaces with reliefs formed thereon, said plate-like links of said at least one relieved pair each comprises an elongated member having a long axis, a longitudinal center, first and second ends, inside and exterior surfaces, and first and second longitudinal edges, said first and second transverse pintle holes being near said first and second ends respectively, said inside surface of said link having first and second relief surface portions adjacent said first and second ends respectively, said first and second relief surface portions sloping outwardly toward their respective first and second ends, said first and second relief surface portions being followed by third and fourth surface portions respectively which are coplanar and parallel to said long axis of said link, said third and fourth surface portions being joined by a fifth V-shaped relief surface portion having sides which are angled toward said exterior surface and converge at about the longitudinal center of said link, both of said block-like links joined by said pair of relieved plate-like links are connected thereto by pintles, one pintle passing through said first pintle holes of said relieved pair of links and an elongated hole in one of said block-like links and the other pintle passing through said second pintle holes in said relieved pair of links and an enlarged pintle hole in the other of said block-like links, both of said block-like links joined by said relieved pair of plate-like links being capable of articulation with respect thereto in both horizontal directions by virtue of said enlarged pintle holes in said block-like links and said first, second and fifth relief surface portions of said relieved pair of plate-like links, whereby horizontal articulation of said chain is provided at selected ones but not all of said pintles.

6. The pusher-type chain claimed in claim 5 wherein said pusher elements are of such construction that the links joined directly thereto are capable of horizontal articulation.

7. The pusher-type chain claimed in claim 5 wherein said pusher elements are of such construction that the links joined directly thereto are precluded from horizontal articulation.

8. An improved pusher-type conveyor chain for a conveyor of the type comprising at least two elongated sections each having a bottom with an upper surface and parallel longitudinal edges with upstanding flanges extending along said edges, said conveyor sections being joined together end-to-end such that they can be shifted with respect to each other in lateral horizontal directions and vertical directions upwardly and downwardly, said pusher-type chain being continuous and being adapted to be driven in a conveying direction along each conveyor section bottom upper surface whereby to advance therealong material to be conveyed, said chain comprising a plurality of pusher elements normally extending substantially transversely of said conveying direction, adjacent pusher elements being joined together by a series of block-like links having transverse pintle holes near their ends and pairs of identical plate-like links having transverse pintle holes near their ends, said block-like links and said plate-like link pairs being arranged alternately with their adjacent pintle holes aligned and joined together by pintles passing through said aligned pintle holes, the improvement comprising the plate-like links of two pairs thereof, located between each adjacent pair of pusher elements, having opposed inside surfaces with reliefs formed thereon, said relieved pairs of plate-like links oppositely oriented and joined together by a block-like link having two elongated pintle holes, each of said plate-like links of said pairs thereof comprises an elongated member having a longitudinal axis, first and second ends, inside and exterior surfaces, and first and second longitudinal edges, said first and second transverse pintle holes being near said first and second ends respectively, said inside surface of said link having a first relief surface portion adjacent said first end angled outwardly toward said first end, said first relief portion being followed by a second surface portion parallel to the long axis of said link, said second surface portion being followed by a third relief surface portion beginning at about that peripheral portion of said first pintle hole nearest said first end and angled therefrom toward said exterior surface of said link, said third relief surface portion terminating in a transition portion near said second pintle hole, said inside surface of said link having a fourth surface portion extending from said transition portion to said second link end and being coplanar with said second surface portion, said block-like link connecting said relieved pairs of plate-like links being joined thereto by pintles passing through said elongated pintle holes of said block-like link and through said first pintle holes of said adjacent relieved plate-like links, said block-like link being capable of articulation in both horizontal directions with respect to both pairs of relieved plate-like links by virtue of said elongated pintle holes in said block-like link and said first and third relief surface portions of said relieved plate-like links of said pairs, whereby horizontal articulation of said chain is provided at selected ones but not all of said pintles.

9. The pusher-type chain claimed in claim 8 wherein said pusher elements are of such construction that the links joined directly thereto are capable of horizontal articulation.

10. The pusher-type chain claimed in claim 8 wherein said pusher elements are of such construction that the links joined directly thereto are precluded from horizontal articulation.

11. A plate-like link for use in a pusher-type conveyor chain of the type having a plurality of pusher elements, adjacent ones of which are joined together by a series of block-like links having first and second transverse pintle holes near their ends and pairs of identical plate-like links having first and second transverse pintle holes near their ends, said block-like links and said plate-like links being arranged alternately with their adjacent pintle holes aligned and joined together by pintles passing through said aligned pintle holes, said plate-like link comprising an elongated member having a long axis, first and second ends, inside and exterior surfaces, and first and second longitudinal edges; said first and second pintle holes thereof being located near said first and second ends thereof respectively, said inside surface of said plate-like link having a first relief surface portion adjacent said first end angled outwardly toward said first end, said first relief portion being followed by a second surface portion parallel to the long axis of said plate-like link, said second surface portion being followed by a third relief surface portion beginning at about that peripheral portion of said first pintle hole nearest said first end and angled therefrom toward said exterior surface of said link, said third relief surface portion terminating in a transition portion near said second pintle hole, said inside surface of said link having a fourth surface portion extending from said transition portion to said second link end and being coplanar with said second surface portion.

12. A plate-like link for use in a pusher-type conveyor chain of the type having a plurality of pusher elements, adjacent ones of which are joined together by a series of block-like links having first and second transverse pintle holes near their ends and pairs of identical plate-like links having first and second transverse pintle holes near their ends, said block-like links and said plate-like links being arranged alternately with their adjacent pintle holes aligned and joined together by pintle means passing through said aligned pintle holes, said plate-like link comprising an elongated member having a long axis, a longitudinal center, first and second ends, inside and exterior surfaces, and first and second longitudinal edges, said first and second transverse pintle holes being near said first and second ends respectively, said inside surface of said link having first and second relief surface portions adjacent said first and second ends respectively, said first and second relief surface portions being angled outwardly toward their respective first and second ends, said first and second relief surface portions being followed by third and fourth surface portions respectively which are coplanar and parallel to said long axis of said link, said third and fourth surface portions being joined by a fifth V-shaped relief surface portion having sides which are angled toward said exterior surface and converge at about the longitudinal center of said link.

* * * * *